United States Patent
Elder et al.

(10) Patent No.: US 8,982,810 B2
(45) Date of Patent: *Mar. 17, 2015

(54) APPARATUS AND METHOD FOR REDUCING NOISE IN SEISMIC DATA

(75) Inventors: Keith Elder, Richmond, TX (US); Steven Kooper, Stafford, TX (US); Andras Feszthammer, Stafford, TX (US); Donald E. Clayton, Houston, TX (US); Henry T. Polk, Houston, TX (US)

(73) Assignee: INOVA Ltd., Houston, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/324,562

(22) Filed: Dec. 13, 2011

(65) Prior Publication Data

US 2012/0082003 A1 Apr. 5, 2012

Related U.S. Application Data

(63) Continuation of application No. 12/023,725, filed on Jan. 31, 2008, now Pat. No. 8,077,740.

(60) Provisional application No. 60/887,788, filed on Feb. 1, 2007.

(51) Int. Cl.
*H04W 4/00* (2009.01)
*G01V 1/22* (2006.01)

(52) U.S. Cl.
CPC .................................. *G01V 1/22* (2013.01)
USPC ........................................................ 370/329

(58) Field of Classification Search
None
See application file for complete search history.

(56) References Cited

U.S. PATENT DOCUMENTS

| | | | |
|---|---|---|---|
| 3,733,584 A | 5/1973 | Pelton et al. |
| 3,806,864 A | 4/1974 | Broding et al. |
| 3,886,494 A | 5/1975 | Kostelnicek et al. |
| 4,086,504 A | 4/1978 | Ezell et al. |
| 4,236,234 A | 11/1980 | McDavid et al. |
| 4,296,485 A | 10/1981 | Clemens |
| 4,297,700 A | 10/1981 | Nard et al. |
| 4,366,561 A | 12/1982 | Klein |
| 4,628,494 A | 12/1986 | Rialan et al. |
| 4,639,901 A | 1/1987 | Warmack et al. |
| 4,644,506 A | 2/1987 | Cretin et al. |

(Continued)

FOREIGN PATENT DOCUMENTS

| | | |
|---|---|---|
| EP | 0250280 A1 | 12/1987 |
| EP | 0552769 A2 | 7/1993 |

(Continued)

OTHER PUBLICATIONS

LRS Quarterly, vol. 1, Issue 3, May 12, 2003.

(Continued)

*Primary Examiner* — Anh-Vu Ly
(74) *Attorney, Agent, or Firm* — Mossman, Kumar & Tyler PC

(57) ABSTRACT

A method of acquiring seismic data. The method includes receiving seismic signals at one or more sensors; sampling the received seismic signals into a plurality of samples, compressing at least some of the samples in selected packets before arranging the compressed samples into packets; arranging the samples into a plurality of packets; computing packet efficiency for a packet of the plurality of packets; transmitting the plurality of packets by varying time intervals between transmissions of the packets.

18 Claims, 6 Drawing Sheets

(56) References Cited

U.S. PATENT DOCUMENTS

| | | | |
|---|---|---|---|
| 4,725,992 A | 2/1988 | McNatt et al. | |
| 4,807,200 A | 2/1989 | Montes et al. | |
| 4,814,711 A | 3/1989 | Olsen et al. | |
| 4,815,944 A | 3/1989 | Maruyama et al. | |
| 4,885,724 A | 12/1989 | Read et al. | |
| 4,905,205 A | 2/1990 | Rialan | |
| 4,908,803 A | 3/1990 | Rialan | |
| 4,967,400 A | 10/1990 | Woods | |
| 4,979,152 A | 12/1990 | Rialan et al. | |
| 5,189,642 A | 2/1993 | Donoho et al. | |
| 5,206,835 A | 4/1993 | Beauducel | |
| 5,276,655 A | 1/1994 | Rialan et al. | |
| 5,351,244 A | 9/1994 | Rialan et al. | |
| 5,363,094 A | 11/1994 | Staron et al. | |
| 5,396,246 A | 3/1995 | Coquerel | |
| 5,481,502 A | 1/1996 | Cretin et al. | |
| 5,550,787 A | 8/1996 | Rialan et al. | |
| 5,563,847 A | 10/1996 | Grouffal et al. | |
| 5,617,371 A | 4/1997 | Williams | |
| 5,623,455 A | 4/1997 | Norris | |
| 5,627,798 A | 5/1997 | Siems et al. | |
| 5,681,008 A | 10/1997 | Kinstler | |
| 5,706,250 A | 1/1998 | Rialan et al. | |
| 5,724,241 A | 3/1998 | Wood et al. | |
| 5,745,074 A | 4/1998 | Laude | |
| 5,805,063 A * | 9/1998 | Kackman | 340/539.17 |
| 5,829,520 A | 11/1998 | Johnson | |
| 5,832,490 A * | 11/1998 | Riley | 707/999.101 |
| 5,959,529 A | 9/1999 | Kail, IV | |
| 5,978,313 A | 11/1999 | Longaker | |
| 6,002,640 A | 12/1999 | Harmon | |
| 6,002,641 A | 12/1999 | Chien | |
| 6,023,444 A | 2/2000 | Naville et al. | |
| 6,061,299 A | 5/2000 | Grouffal et al. | |
| 6,070,129 A | 5/2000 | Grouffal et al. | |
| 6,078,283 A | 6/2000 | Bednar | |
| 6,105,064 A | 8/2000 | Davis et al. | |
| 6,208,247 B1 | 3/2001 | Agre et al. | |
| 6,208,626 B1 | 3/2001 | Brewer | |
| 6,219,620 B1 | 4/2001 | Park et al. | |
| 6,226,601 B1 | 5/2001 | Longaker | |
| 6,255,962 B1 | 7/2001 | Tanenhaus et al. | |
| 6,255,969 B1 | 7/2001 | Crayford | |
| 6,322,109 B1 | 11/2001 | Campbell et al. | |
| 6,332,109 B1 | 12/2001 | Sheard et al. | |
| 6,353,577 B1 | 3/2002 | Orban et al. | |
| 6,430,106 B1 | 8/2002 | Staron | |
| 6,469,639 B2 | 10/2002 | Tanenhaus et al. | |
| 6,501,413 B2 | 12/2002 | Annan et al. | |
| 6,553,316 B2 | 4/2003 | Bary et al. | |
| 6,560,565 B2 | 5/2003 | Roy et al. | |
| 6,750,768 B2 * | 6/2004 | Yang et al. | 340/571 |
| 6,885,716 B1 * | 4/2005 | Zalud et al. | 375/361 |
| 6,889,349 B2 * | 5/2005 | Ku | 714/739 |
| 6,898,529 B2 | 5/2005 | Gao et al. | |
| 6,944,096 B2 | 9/2005 | Lemenager et al. | |
| 6,977,867 B2 | 12/2005 | Chamberlain | |
| 7,034,711 B2 | 4/2006 | Sakatani et al. | |
| 7,050,355 B2 | 5/2006 | Robertsson et al. | |
| 7,161,962 B1 * | 1/2007 | McNeill et al. | 370/493 |
| 7,304,948 B1 * | 12/2007 | Ong | 370/230.1 |
| 7,327,806 B2 * | 2/2008 | Liem et al. | 375/322 |
| 8,077,740 B2 * | 12/2011 | Elder et al. | 370/468 |
| 2001/0030907 A1 | 10/2001 | Bachrach | |
| 2003/0234730 A1 | 12/2003 | Arms et al. | |
| 2004/0057398 A1 * | 3/2004 | Black | 370/321 |
| 2004/0128387 A1 * | 7/2004 | Chin et al. | 709/227 |
| 2004/0156267 A1 | 8/2004 | O'Brien et al. | |
| 2004/0184571 A1 * | 9/2004 | Currivan et al. | 375/346 |
| 2004/0252585 A1 | 12/2004 | Smith et al. | |
| 2004/0257913 A1 | 12/2004 | Ray et al. | |
| 2005/0083784 A1 * | 4/2005 | Iseli et al. | 367/60 |
| 2005/0177310 A1 | 8/2005 | Duncan et al. | |
| 2005/0276162 A1 | 12/2005 | Brinkmann et al. | |
| 2005/0285751 A1 | 12/2005 | Hall et al. | |
| 2006/0050727 A1 * | 3/2006 | Matsunaga et al. | 370/445 |
| 2006/0056432 A1 * | 3/2006 | Azarov | 370/412 |
| 2006/0086497 A1 | 4/2006 | Ohmer et al. | |
| 2006/0145881 A1 | 7/2006 | Sakatani et al. | |

FOREIGN PATENT DOCUMENTS

| | | |
|---|---|---|
| GB | 1550800 | 8/1979 |
| WO | 9713164 A1 | 4/1997 |
| WO | WO9812577 A1 | 3/1998 |
| WO | WO9818022 A1 | 4/1998 |
| WO | WO9960424 A1 | 11/1999 |
| WO | 2005096016 A1 | 10/2005 |

OTHER PUBLICATIONS

408UL Reference Training Guide, Firmware Network Description, Jan. 13, 2000, pp. 13-1 to 13-18.
SGR II, Seismic Group Recorder System: High Technology with a Track Record., Global Universal Sciences, Inc., 1984. pp. 1-6.
SRGIII, Seismic Group Recorder System, Global Universal Sciences, Inc. 1985, pp. 1-4.
08728810.6-1559/2108131 PCT/US2008/052779—European Search Report dated May 21, 2013.
Dmitriyv: "Run-length encoding", Jan. 12, 2007, pp. 1-2, XP055062571, Retrieved from the Internet: URL:http://en.wikipedia.org/w/index.php?title=Run-length_encoding&oldid=100115741 [retrieved on May 10, 2013].

* cited by examiner

APPARATUS AND METHOD FOR REDUCING NOISE IN SEISMIC DATA

CROSS-REFERENCE TO RELATED APPLICATION

This application is a continuation of U.S. application Ser. No. 12/023,725 filed Jan. 31, 2008, now U.S. Pat. No. 8,077,740 issued Dec. 13, 2011, which in turn claims priority from U.S. Provisional Application Ser. No. 60/887,788, filed Feb. 1, 2007, all of which are incorporated herein by reference in their entirety.

BACKGROUND OF THE DISCLOSURE

1. Field of the Disclosure

This disclosure relates to the acquisition of seismic data using seismic spreads.

2. Background of the Art

Seismic surveys are conducted to map subsurface structures, which maps are used to locate and develop oil and gas reservoirs. On land, seismic surveys are conducted by deploying a large array of seismic sensors over selected geographical regions. Typically, these arrays can cover several square kilometers (for example 100 square kilometers) of a geographical area and may include in excess of 30,000 seismic sensors (also referred to as receivers) placed in the ground and arranged in the form of a grid. The receivers are typically geophones and/or accelerometers for land operations. Three-axis accelerometers are often used as receivers.

An energy source, such as an explosive charge (buried dynamite, for example) or a mobile vibratory source is typically used at selected locations in the array to generate acoustic waves or signals (also referred to as acoustic energy) that propagate through the subsurface structures of the earth. The generated acoustic waves reflect at subsurface formation discontinuities, such as boundaries associated with layers of different rock types, salt domes and oil and gas reservoirs. These reflections are sensed at the surface by the seismic sensors in the array. Sensors are typically grouped in small numbers and each group is connected to a separate data acquisition unit (also referred to as a recording unit, or a field service unit). Each data acquisition unit receives the signals from its associated sensors, samples the signals, digitizes the samples, stores the digitized samples, arranges the digitized samples into packets and transmits such packets to a central control unit (also referred to as a central recording unit), either directly or via one or more intermediate units and/or repeaters.

The recorders may transmit the packets via cables or wirelessly to the central control unit, which may be on a mobile unit, such as a truck or at another remote location. The central control unit typically processes the data (at least partially) received from the data acquisition units, stores the processed data for later processing and may send the processed data to another remote unit for further processing of the data. A two or three-dimensional map (also referred to as a seismic image) of the subsurface structures is generated by processing of the data received from the central control unit.

Offshore seismic data acquisition systems typically utilize a compressed air source, such as an air-gun, as the seismic energy source, which is activated at selected locations a few meters (often 5-6 meters) below the water surface while being towed by a vessel. The receivers are deployed either in streamer cables that are towed by the vessel carrying the source or are deployed at the ocean bottom in the ocean-bottom cables. Hydrophones are typically used as the receivers for offshore applications.

In a seismic spread, each recorder transmits a large number of packets. Typically, each packet may contain an "epilog," a payload and a "prolog" that includes a large number samples or words (for example, about 500), each sample having a prescribed number of bits (for example, twelve bits or twenty-four bits, etc). Often, the useful portion of the word includes less than the total number of available bits. Therefore, some or many samples in a packet may occupy bit spaces that contain only leading sign bits. The leading sign bits are simply "ones" or "zeros." Accordingly, there is a need for an improved method and apparatus for preparing, storing and transmitting packets.

Also, it is known that the recorder units in seismic spreads experience coherent noise. Coherent noise is periodic in nature. It is typically undesirable seismic energy that shows a consistent phase from trace to trace, such as ground roll and multiples. Coherent noise can occur due to several different factors, such as: the presence of a common mode induction at the receiver input due to data transmission; and electronic switching in the intrinsic circuits coupled into the receiver by various methods, such as telemetric transmitters radiating energy, limited power supply noise rejection, common circuit elements such as power supplies or ground planes, and high energy computation bursts such as those present during data transfer or intrinsic math functions. Therefore, there is a need for a method and an apparatus that may reduce the coherent noise in seismic data acquisition systems.

SUMMARY OF THE INVENTION

The disclosure herein in one aspect provides a method of acquiring seismic data that includes: receiving seismic signals at a sensor; sampling the received seismic signals from the sensor into a plurality of samples, each sample having a same number of bits ("bit length"); arranging the samples in a packet, wherein the total number of bits corresponding to the samples represented in the packet is less than the number of samples represented in the packet times the bit length; and transmitting the packet to a remote unit (also referred to as the central recording unit, controller or central control unit).

In another aspect, the method may further include: receiving the packet at the control units; decompressing the packet; and storing the information relating to the decompressed samples in a suitable recording medium.

In another aspect, the disclosure provides a method for acquiring seismic data that includes: receiving seismic signals at one or more sensors; sampling the received seismic signals into a plurality of samples, each sample having a selected bit length; arranging the samples in a plurality of packets; transmitting the plurality of packets, wherein time interval between transmissions of the packets varies.

In another aspect, the disclosure provides an apparatus that includes: a circuit for receiving seismic signals from a sensor; a circuit for sampling the received signals; a circuit for digitizing the samples, each digitized sample having a bit length; and a processor that arranges the digitized samples into packets, wherein at least some of the packets include one or more compressed samples. Alternatively or in addition to using compressed samples, the processor may vary the time interval between the transmissions of packets to reduce noise.

It should be understood that examples of the more important features of the apparatus and methods for acquiring and transmitting seismic data from the data acquisition units in a seismic spread have been summarized rather broadly in order that detailed description thereof that follows may be better understood and in order that the contributions to the art may be appreciated. There are, of course, additional features of such apparatus and methods that will be described hereinafter and will form the subject of the disclosure.

BRIEF DESCRIPTION OF THE DRAWINGS

The various features described herein will be best understood from the attached drawings, taken along with the following description, in which like numerals generally have been used to represent similar elements, and in which.

DETAILED DESCRIPTION

The drawings shown and the descriptions provided herein correspond to certain specific embodiments for the purposes of explanation of the concepts contained in the disclosure herein with the understanding that the present disclosure is to be considered an exemplification of the concepts and principles described herein and is not intended to limit the scope of the claims relating to this disclosure.

Figure 1:
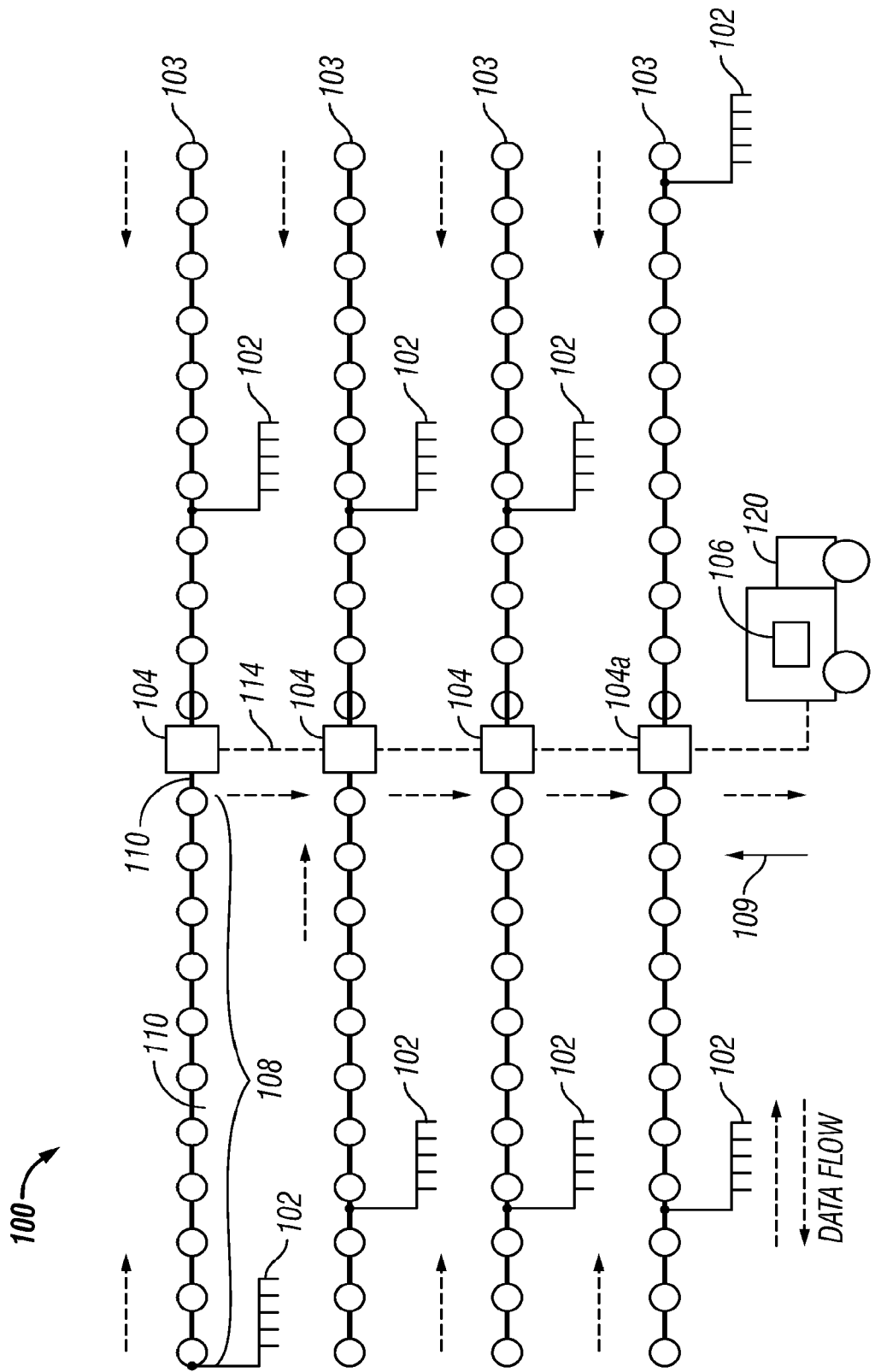
FIG. 1 shows a cable seismic data acquisition system wherein the data acquisition units may include a data compression and/or a time-slot variance manager.

FIG. 1 depicts an exemplary land cable seismic data acquisition system 100, wherein certain elements such as the data acquisition units may include some or all of the features described herein relating to the data compression and/or time slot variance management and perform the various functions described herein. The system 100 is shown to include an array of spaced-apart seismic sensors or receivers 102, arranged along a number of lines or strings 108. Each line contains a number of data acquisition units or devices 103. Each data acquisition unit 103 in each line 108 is coupled to a cross-line unit 104. Several cross-line units 104 and associated lines are usually coupled together by cabling, such as shown by the dotted line 114, which is then coupled to central control unit or control unit, such as a unit 106, which may be stationed on a mobile unit, such as a truck 120.

The sensors 102 are usually spaced several meters apart (for example between 30-80 meters) and each line 108 may include several data acquisition units 103 connected by communication lines 110. Each data acquisition unit 103 typically includes a preamplifier that amplifies the signals received from its corresponding sensors 102, samples the amplified signals into a number of discrete digital representations ("samples") having a fixed number of bytes, each byte containing a fixed number of bits. The successive data acquisition units in a line act as repeaters of data received from their respective preceding data acquisition units. Each cross-line unit 104 may perform some signal processing and then store the processed signals as seismic information for later retrieval. The cross-line units 104 act as repeaters and are typically coupled, either in parallel or in series, with one of the units 104a serving as an interface between the central control unit or control unit (CU) 106 and a number of cross-line units 104. In the cable system of FIG. 1, data are usually relayed from one data acquisition unit to the next unit and through several cross-line units before such data reaches the central control unit 106. The control unit is in bidirectional data communication with each data acquisition unit 103, as shown by data flow arrows 109. A source, controlled by the control unit is activated to induce seismic energy into the earth at selected locations in the seismic spread.

Figure 2:
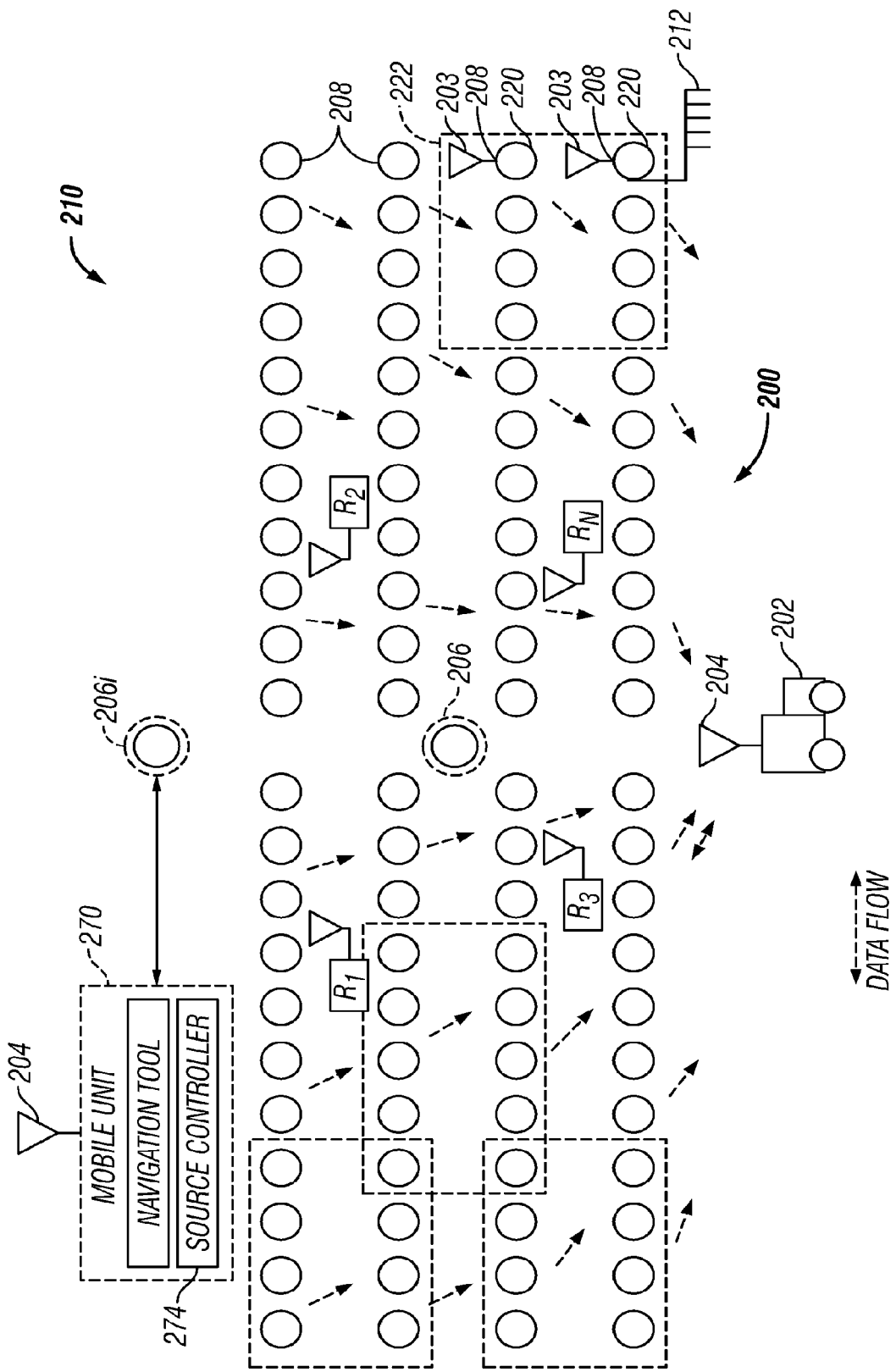
FIG. 2 shows a wireless seismic data acquisition system wherein the data acquisition units may include data compression and/or a time-slot variance manager.

Referring to FIG. 2 there is shown a representation of a wireless seismic data acquisition system 200 according to one embodiment wherein the various data acquisition units may include the data compression and/or time-slot variance features described herein. The system 200 includes a central controller 202 in data communication with each wireless data acquisition unit 208 forming an array (spread) 210 for seismic data acquisition. The data acquisition unit 208 and data acquisition unit 103 of FIG. 1 may be configured to perform the same functions relating to the data compression and transmission of such data. The wireless communication between the central controller 202 with the data acquisition unit 208 may be direct bidirectional wireless communication or via an intermediate unit such as a repeater unit (RU). Each data acquisition unit 208 includes one or more sensors 212 for sensing seismic energy. The sensors 212 may be any suitable seismic sensors, including geophones, and one or more component accelerometers. Direct communication, as used herein, refers to individualized data flow as depicted in FIG. 2 by dashed arrows. The data flow is bidirectional between the central controller 202 and the wireless data acquisition unit 208. The communication might be in the form of radio signals transmitted from and received by the data acquisition units 208 and central controller 202 via suitable antennas 203 and 204 respectively.

In one aspect, a seismic energy source 206, such as an explosive source, a vibrator carried by a mobile unit, such as a truck 202, or a compressed gas source, generates seismic energy of known characteristics, such as magnitude, frequency, etc., at known locations in the seismic spread to impart seismic energy into the subterranean formation. The source controller 274 can be programmed to receive and transmit information such as instructions to make the source 206i ready for firing, fire the source 206i, provide data indicative of the location of the mobile unit 270, the arming status of the source 206i, and data such as return shot attributes.

The functions described above in reference to FIG. 2 that relate to the operation and control of the source and those of the control unit equally apply to the cable seismic spread of FIG. 1.

In another aspect, the seismic spread configuration shown in FIG. 2 may be modified, wherein a number of neighboring data acquisition units 208 forming a "group" or "cell" communicate within the control unit 202 via an intermediate data acquisition unit (also referred to herein as an Alpha unit). An Alpha unit may also be configured to perform the functions of the data acquisition unit and further configured to performed a variety of other functions, such as establishing two-way communication between the Alpha unit and its associated data acquisition units. In this manner, the various data acquisition units may be grouped into several groups, each group including an Alpha unit. For example, the data acquisition 220 in the group 222 may be an Alpha unit for the group of data acquisition units in the geographical area 222. Other groups of data acquisition units in the seismic spread 210 may be similarly grouped.

Alternatively, one or more separate repeater units (RUs) may be placed at selected locations in the seismic spread 210, such as shown by repeaters $R_1, R_2 \ldots R_n$ etc. Often only one repeater is used in a seismic spread. Each repeater unit may be configured to establish a two-way radio or wireless communication between its associated data acquisition units and the control unit 220. In the above-noted configurations, the individual data acquisition units communicate with their associated Alpha unit or the repeater unit as the case may be and the Alpha unit or the repeater unit communicates with the central controller 202. The individual data acquisition units in a group wirelessly communicate with their associated Alpha unit or the repeater unit wirelessly. In certain situations, it may be desirable to connect the data acquisition units to its associated Alpha unit with electric or fiber optic.

Figure 3:
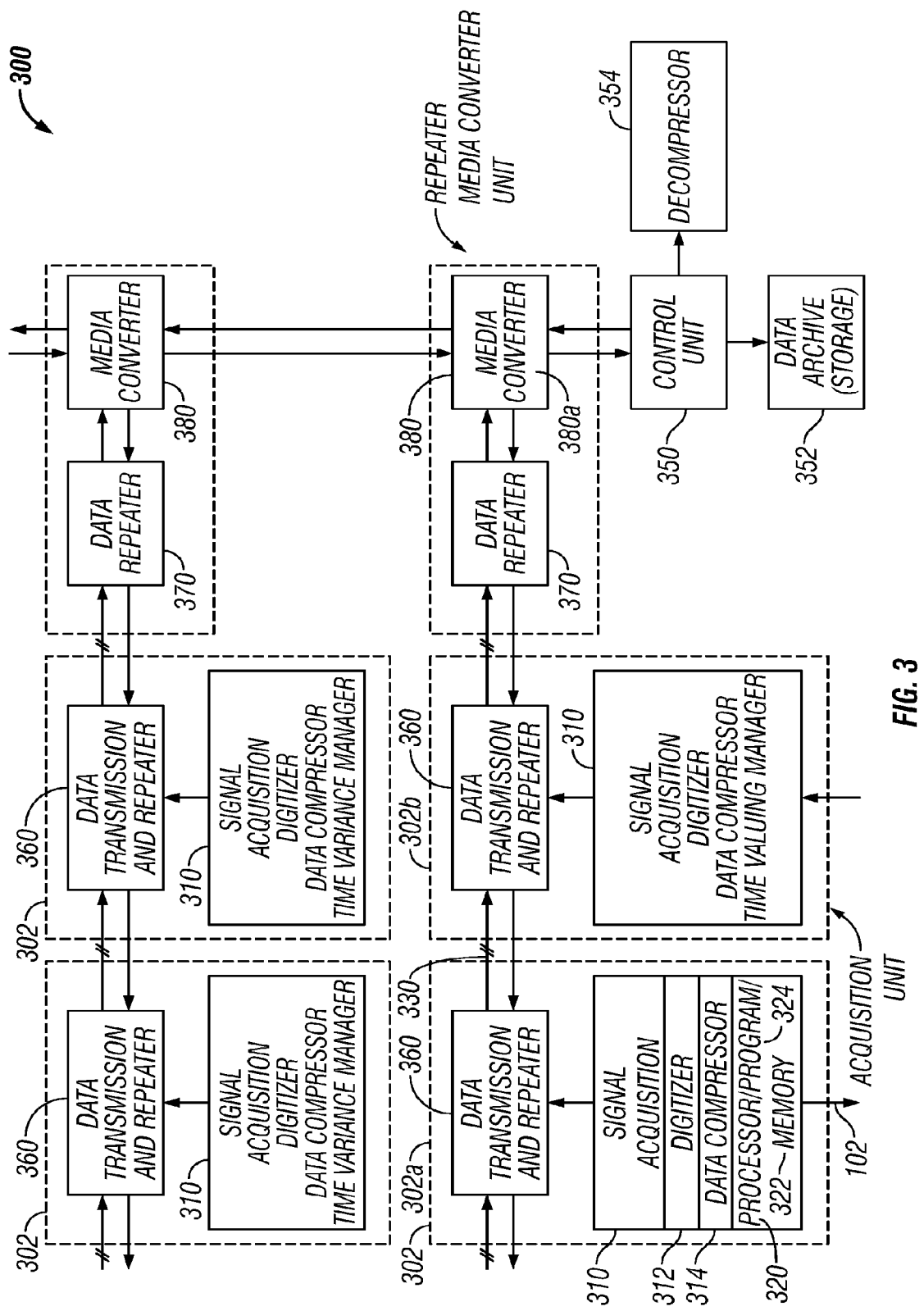
FIG. 3 shows a high level functional block diagram of the data acquisition units that may be utilized in the seismic data acquisition systems of FIGS. 1 and 2.

FIG. 3 shows a high level functional block diagram 300 of the data acquisition units that include circuitry and perform functions and methods according to the various aspects of the disclosure. Each data acquisition unit 302 is shown coupled to one or more seismic receivers 102 from which it receives signals generated by the receivers in response to the detection of seismic signals from the earth's subsurface. The detected signals may be in response to the activation of a seismic source as described above and/or the seismic signals produced in response to noise, such as generated by vehicles passing near the survey area, thunderstorms, rails, ships, etc. Each data acquisition unit 302 is shown to include a signal acquisition section 310 that contains circuitry for receiving signals from the sensor 102, circuitry for conditioning the received signals and circuitry for sampling the received signals. Each signal acquisition section 310 may include a processor 320, a memory 322 that may store data and computer programs 324, which programs are executed by the processor 320 to perform the various operations and methods described herein and to perform other functions known in the art for such devices.

The signal acquisition section 310 samples the received signals in small time units. As an example, the control unit 350 may send a command signal to a particular data acquisition unit 302a to start acquiring data. The command, for example, may be sent prior to the firing of the seismic source. The data acquisition unit 302a then starts to receive the signals from its associated sensors 102, conditions the signals and then samples the signals conditioned. As an example, the data acquisition unit 302a may be configured to acquire data for a selected time, for example three seconds, with a selected sample time such as two milliseconds. In this example, the data acquisition unit 302a will start sampling a particular signal from a receiver 102 at time $t_0$ every two milliseconds to provide 1500 samples. The data acquisition unit 302a may include a digitizer 312 that digitizes each sample, wherein each sample has the same number of bytes. For example, each sample may have three bytes, each byte having eight bits. In this example, each digitized sample (also referred to herein as a "word") will have twenty-four bits. The samples may contain any other suitable number of bits, for example 12, 16, 32 or more. The processor 320 in the data acquisition unit 302, utilizing the programmed instructions 324, stores the digitized samples in the memory 322, which may be a buffer. In one aspect, the processor stores all the bits for the samples. In another aspect, the processor 320 may delete a selected number of leading sign bits from selected digitized samples and store such compressed samples in the memory. In such a case, the compressor may insert an indicator corresponding to the compressed samples which indicator will enable the processor to arrange the compressed samples into packets and also enable the decompression of the compressed samples at a later time, for example using the control unit. The indicator may correspond to any particular stored sample or a group (series) of samples. The stored digitized samples are then arranged in packets by the processor 320 as described below with respect to FIGS. 7, 9 and 10.

Still referring to FIG. 3, a data transmission and repeater section 360 transmits the packets via the communication link 330 to the next data acquisition unit, such as unit 302b, which transmits the packets received from its preceding data acquisition units and the packets created by the unit 302b itself to the next data acquisition unit or the data repeater, such as the data repeater 370, at the end of the line. Each repeater 370 may transmit the received packets to one or more media converters 380. The media converters 380 may be serially coupled so that the last such media converter 380a transmits the data received from other media converters and the repeaters from its corresponding line to the control unit 350 as well as to data archive 352 or decompressor 354. Thus, in the configuration of FIG. 3, the data acquisition units 302 acquire, condition, sample, and digitize samples and transmit the digitized data to the control unit 350 in the form of packets. The communication links 330 in FIG. 3 may be electric conductors, fiber optic links or wireless connections. Also, the data acquisition units 302 may transmit the packets directly to a common repeater associated with a group of data acquisition units, which in turn sends the packets to the control unit 350.

In one aspect, the data acquisition units 302 may include a data compressor 314. The data compressor may be a program or routine that may include any suitable data compression algorithm. The data compression program and algorithm are stored in the memory 322, which program and algorithm are utilized by the processor 320 to compress the digitized sample data prior to incorporating such samples into a packet.

Figure 4:
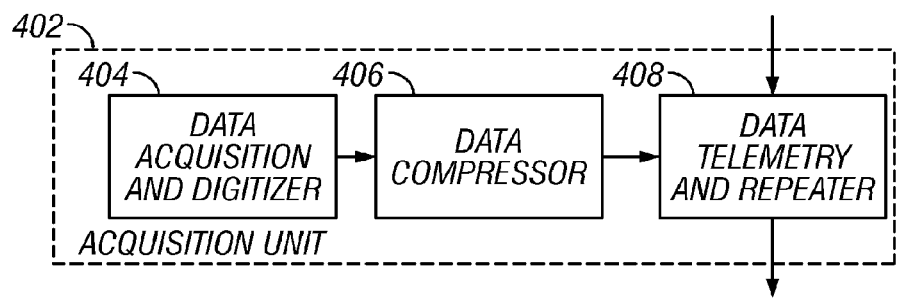
FIG. 4 shows a functional flow diagram for performing a data compression according to one exemplary embodiment.

FIG. 4 shows a configuration wherein an exemplary data acquisition unit 402 acquires seismic signals and digitizes the seismic signals in section 404. A data compressor 406 compresses the digitized samples, and forms the packets, which are transmitted by the data telemetry and repeater section 408 to the control unit 350 (FIG. 3).

Figure 8:
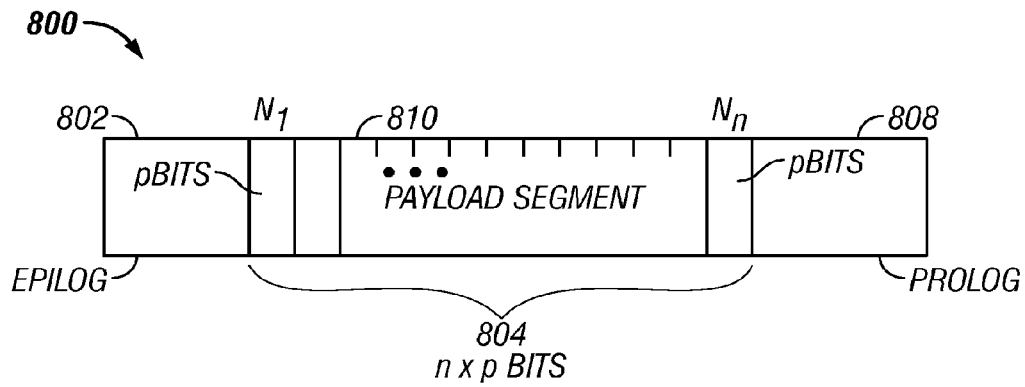
FIG. 8 shows an exemplary packet that includes an epilog, a payload and a prolog, wherein the number of bits for each sample in the payload is the same.
Figure 9:
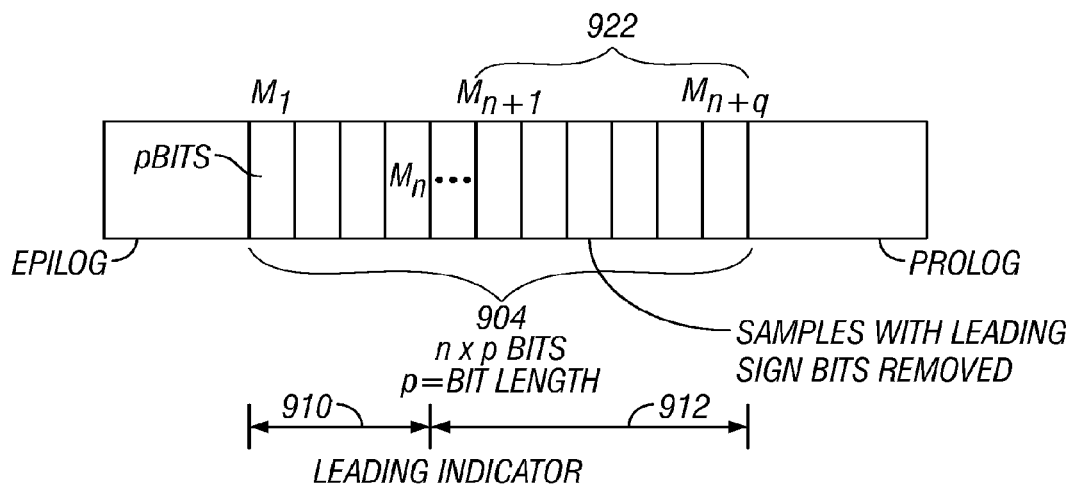
FIG. 9 shows an exemplary packet that includes an epilog, a payload and a prolog, wherein some of the samples in the payload are compressed while the other samples are not compressed.
Figure 10:
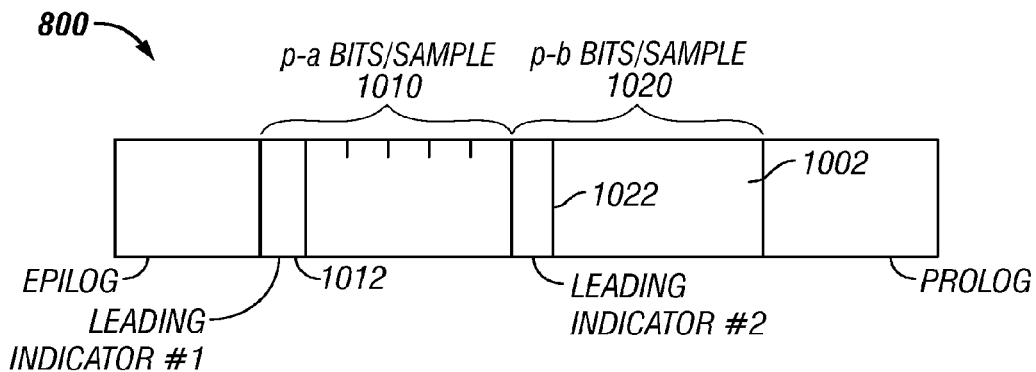
FIG. 10 shows another example of a packet that includes different sets of samples that are differently compressed.

FIGS. 8-10 show examples of data packets that may be made according to one aspect of the disclosure. FIG. 8 shows a data packet 800 having an epilog 802, a payload or seismic data section 804 and a prolog 808. In one aspect, the epilog 802 may contain a fixed number of bytes that contain information relating to a destination address, source address and other information that enables the control unit 350 to appropriately decipher the received packets and relate the particular samples to particular sensors in the seismic spread. The prolog 808 may contain packet confirmation information or other desired information. The payload section typically may include bit spaces for "n" samples (designated as samples $n_1$ though $n_n$), each sample having the same number of bits "p." Thus, the payload may contain n×p total bits. In the example of FIG. 8, each sample occupies "p" bits, shown by the segment 810. During seismic data acquisition, a sequence of samples may be such that the digitized words occupy most of the "p" bits, i.e., without a significant number of leading sign bits. Such are typically arranged in sample packets without data compression.

FIG. 9 shows an example of a packet in which the sample has been compressed by removing a certain number of leading sign bits from a certain number of samples. In the example of FIG. 9, the payload section 904 is shown divided into two sections 910 and 912, wherein the section 910 includes "n" samples ($m_1$ through $m_n$), each such sample having the full word length, i.e., "p bits," while the section 912 has "q" samples $m_{n+1}$, through $m_{n+q}$, each such sample having "p-z" bits, where z is a whole number. Thus, if p=12 and z=4, the samples $m_1$ through $m_n$ each will occupy 12 bit spaces while the remaining samples $m_{n+1}$ through $m_{n+q}$, each will occupy 8 bit spaces. Such a method enables using the spaces vacated due to the removal of leading sign bits to pack additional samples in the same packet. For example, if the capacity of a packet is 500 samples of twenty-four bits, and 300 of the samples have four leading sign bits removed, this will open up 300×4=1200 bit spaces for packing additional samples in that packet. In order for the control unit to decompress the packet data, the data acquisition unit processor is programmed to encode the packet that contains the compressed data. In one aspect, the processor may insert an instruction word or a leading indicator that precedes the set or sequence of samples that will have the leading sign bits removed. In one aspect, the instruction word or the leading indicator simply may occupy a desired number of bits, such as shown by bit spaces 922, containing the instructions that may indicate the number of compressed samples following the indicator and the nature of compression, i.e., the number of bits removed from each such compressed sample. Any suitable instruction may be used as the instruction word or the leading indicator. If the digitized samples are stored in a memory in compressed form, then the processor may arrange such compressed samples in a packet.

FIG. 10 shows another example of a packet wherein the first section 1010 of the payload section 1002 includes a first leading indicator 1012 that corresponds to a certain number of samples, each having "p-a" bits and a second section 1020 that includes a second leading indicator 1022 that corresponds to a certain number of samples, each having "p-b" bits. In each case, the leading indicator may include information that enables the control unit to determine the number of compressed samples and the number of bits present in each sample or the number of leading sign bits that have been removed from each such sample. The control unit receives the packets from the various data acquisition units, decompresses the packets and stores the samples. Each packet may include any combination of compressed and uncompressed samples, arranged in any desired order. The control unit may process the samples and may store the processed samples and/or transmit the processed data to a remote processing unit for further processing to obtain the subsurface maps. The packets may contain any number of combinations of uncompressed and compressed samples.

Figure 5:
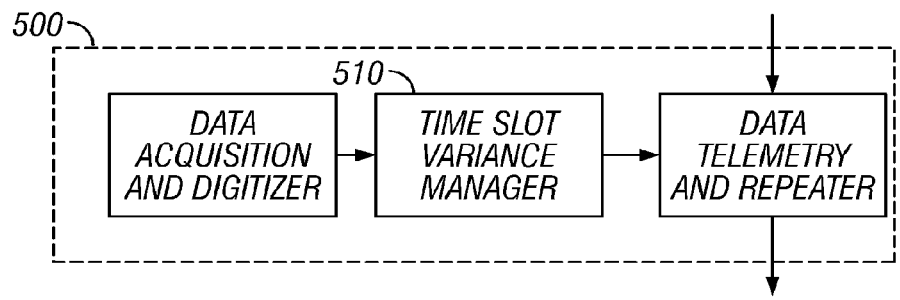
FIG. 5 shows a functional flow diagram for time-slot variance management relating to the transmission of packets according to one exemplary embodiment.

In another aspect, the data acquisition units may perform time variance relating to the transmissions of packets to reduce the coherent noise that is often associated in the seismic data recording units. In one aspect, the time variance may be performed after the packets have been prepared by the data acquisition unit, such as shown in FIG. 5. In one aspect, a time variance manager 510 associated with the data acquisition unit 500 may include a routine or algorithm that is used by the processor in the data acquisition unit to vary the time between the transmissions of successive packages. In one aspect, the time variance manager may utilize a suitable random number generator to determine the time between transmissions of successive packets. Varying the time between the transmissions of the packets makes the coherent noise to appear at non-periodic times, which the seismic data acquisition system can distinguish from the seismic signals and is thus able to remove such noise from the seismic signals. When the time between the transmissions of packets is constant, a periodic noise, such as a coherent noise, can appear to the system as a seismic signal, thereby providing erroneous measurements. The time variance manager also may utilize time slots (bins) and a random time variance within each time slot to determine the time variance between the transmissions of the packets.

Figure 6:
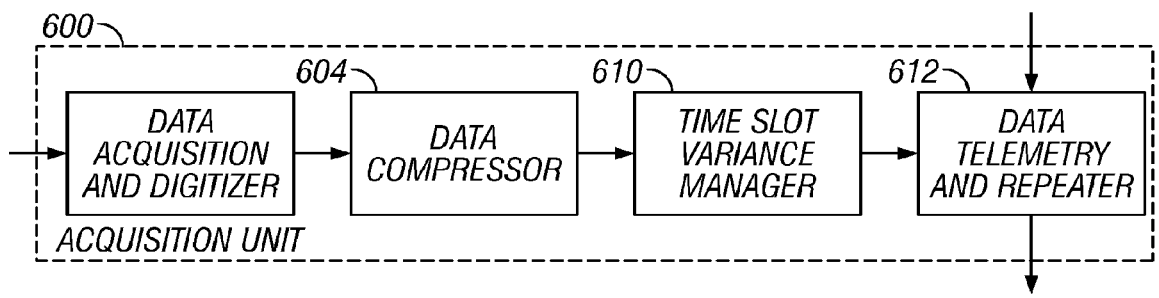
FIG. 6 shows a functional flow diagram for data compression and time-slot variance management of packets according to one exemplary embodiment.

In another aspect, the data acquisition unit 600 may perform the time-slot variance after the data compression, as shown in FIG. 6. In the configuration of FIG. 6, the data compressor 604 compresses the data as described above or by any other suitable method and assembles the packets. The time slot variance manager 610 then varies the time between transmissions of successive packets. The data telemetry section 612 then transmits the packets to the central unit. Because seismic signals have an inherent signal variance from trace to trace, the number of compressed samples can be different, therefore the time it takes the data acquisition unit to prepare successive packets can vary, which can cause the time between transmissions of packets to vary, thereby reducing the coherent noise.

Figure 7:
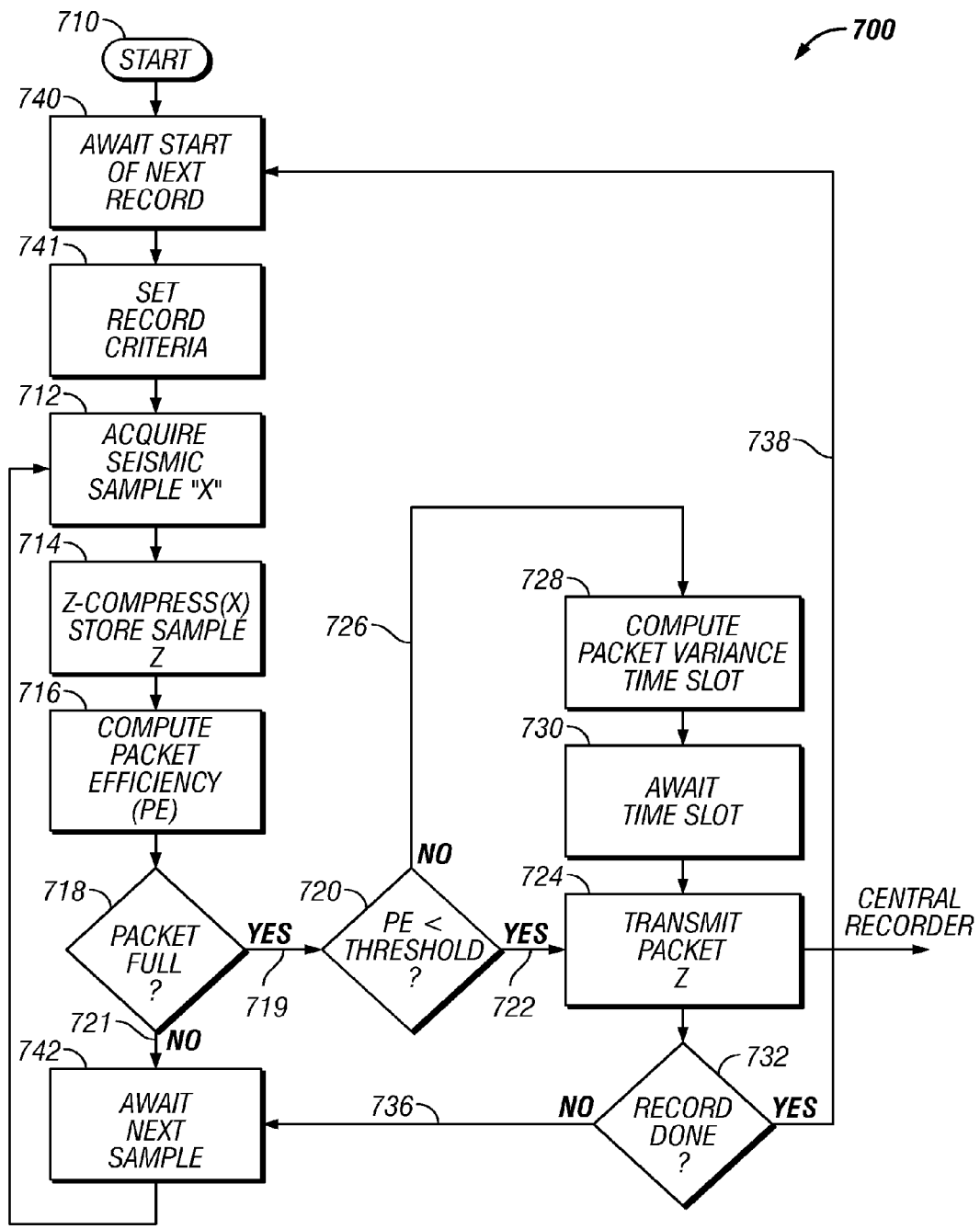
FIG. 7 shows an exemplary flow chart of a method for data compression and time-slot variance management of packets.

FIG. 7 shows an exemplary flow diagram 700 of a method that may be utilized by the data acquisition units to prepare and transmit data packets. The data acquisition unit upon receiving a command from the central control unit starts the process of acquiring samples from its associated sensors, such as sample "x," as shown in box 712 and compresses the digitized sample "x" to form the sample "z" having a selected bit length and stores the digitized sample in the memory, as shown at box 714. The processor then computes the packet efficiency "PE" (box 716), which may be defined as the number of samples represented in the packet. The PE depends upon the number of total leading sign bits deleted from all the samples in a packet. The processor forms the packet with appropriate epilog, payload and prolog and appropriate leading indicators, such as 1012 and 1022 of FIG. 10. The processor then determines whether the packet is full as shown in the decision box 718. A full packet means that all bit spaces in the payload section of the packet have been used or occupied. If "no," i.e., the packet is not full (decision line 721), the processor waits for the next sample (box 742) and acquires the next seismic sample "x" (box 712) and continues the process of acquiring and compressing samples (when appropriate) to complete the packet. When the packet is full (decision line 719), the processor may transmit the packet to the control unit. Alternatively, the processor may determine whether the PE is less than a preset threshold (box 720), which may be any suitable value provided to the processor, either as a stored value in an associated memory or via a command from the control unit.

In one aspect, when the PE is less than the threshold (as shown by decision line 722), the processor transmits the packet to the control unit without applying any time variance technique, as shown in block 724. When the PE is equal to or greater than the threshold, as shown by decision line 726, the processor may be programmed to compute a variance time slot for the packet, as shown at box 728 and wait for the time slot (box 730) and thereafter transmit the packet as shown at box 724. Once a particular packet is transmitted, the processor determines if the record for a seismic signal has been completed (box 732), i.e., all the packets corresponding to a particular record have been transmitted. If "yes" (decision line 738), the process waits for the start of the next record, as shown in block 740, sets the record criteria (box 741) for the next record and starts the process of acquiring samples as provided above. If the record has not yet been completed (decision line 736), the processor waits for next sample (box 742) and continues to acquire seismic samples to form the next packet. The above-described flow chart shows one particular method. However, any flow scheme that provides for compressing the data in the manner described herein and/or uses a time variance technique may be utilized for the purposes of this disclosure. It should be noted that the methods and functions described herein equally apply to data acquisition units contained in marine seismic data acquisition systems.

Thus, the disclosure herein in one aspect provides a method of acquiring seismic data that includes: receiving seismic signals at a sensor; sampling the received seismic signals from the sensor into a plurality of samples, each sample having a same number of bits (bit length); arranging the samples in a packet, wherein the total number of bits corresponding to the samples represented in the packet is less than the number of samples represented in the packet times the bit length of the samples represented in the packet; and transmitting the packet to a remote unit. In one aspect, certain number of leading sign bits from at least some of the samples may be removed before arranging such samples in the packet, thereby compressing the data corresponding to the samples represented in the packet. The leading sign bits may be the leading zeros or leading ones. The method may further include inserting an indicator in the packet that identifies the samples in the packet that have bits removed therefrom. The method may further include transmitting the packet to a control unit. The packet may be transmitted by any suitable manner, including via a land cable, wirelessly, an ocean-bottom cable, or a streamer cable that is in data communication with the control unit on a vessel, and electrical conductor or fiber optic links. In one aspect, the samples may be arranged such that each sample belonging to one set of samples in the packet occupies the number of bits that is equal to the bit length and each sample belonging to a second set occupies the number of bits less than the bit length. Any combination of compressed and uncompressed samples may be used in a particular packet.

In another aspect, the method may include receiving a packet at the remote unit; decompressing the packet; and storing the information relating to the samples in the packet in a suitable medium, such as solid state memory, hard disc, tape, etc. The received samples in one aspect may be in response to the transmission of a seismic signal into the earth and in another aspect generated by noise. In another aspect, a method is provided that includes: transmitting an acoustic signal into the earth; receiving seismic signals at a one or more sensors in signal communication with the earth; sampling the received seismic signals from the one or more sensors into a plurality of samples and digitizing each sample at a data acquisition unit in signal communication with the one or more sensors, each digitized sample having a predefined bit length; arranging the digitized samples into a plurality of packets, wherein at least some of the packets in the plurality of packets include digitized samples are compressed samples so that each compressed sample occupies less than a bit length; and transmitting the plurality of packets to a remote unit. The transmitting of the packets may include transmitting the plurality of packets with a varying time intervals between the transmissions of at least some of the packets. The time intervals may be computed using any technique that randomizes the time intervals, including a random number generator.

The method may compute packet efficiency for each packet before computing the time intervals between the transmissions of the packets and may transmit the packets without varying the time intervals when the packet efficiency is less than a certain threshold. The varying time may be computed using a time slot technique. The method provides for choosing a random time-slot for each packet across a portion or the entire seismic data acquisition system elements so that no transmission device is on the same time schedule. The method provides for inserting an indicator in the packets that includes compressed digitized samples, which indicator will enable the remote unit to decompress the compressed digitized samples. The control unit may receive the plurality of packets; decompress the compressed digitized samples; process the decompressed samples that may include such techniques as stacking, correlating, noise editing, etc.; and store the processed samples in a data storage medium. The processed samples may be used to obtain a map of the earth's subsurface.

In another aspect, the disclosure provides a method for acquiring seismic data that includes receiving seismic signals at one or more sensors; amplifying the received seismic signals into a plurality of samples, each sample having a fixed bit length; arranging the samples in a plurality of packets; transmitting the plurality of packets, wherein the time interval between the transmissions of successive packets varies. As noted earlier, the time interval between the transmissions of the successive packets may be computed using any technique that randomizes the time intervals, including a random number generator and/or using a time-slot technique.

In another aspect, the method may form packets having different payload sizes, wherein some packets may include compressed samples and may transmit such packets with or without varying the time intervals between the transmissions of such packets.

In another aspect, the disclosure provides a seismic data acquisition apparatus that includes: a circuit for receiving seismic signals from a sensor; a circuit for sampling the received signals; a circuit for digitizing the samples, each digitized sample having a fixed bit length; and a processor that arranges the digitized samples into packets, wherein at least some of the packets include at least some of the samples that occupy number of bits less than the fixed bit length. The data acquisition unit may further include a transmitter that transmits the packets over a communication link, which may be: (i) an electrical conductor; (ii) a wireless link; (iii) a data communication link in a streamer cable; (iv) a data communication link in an ocean-bottom cable; or (v) a fiber optic link. The processor may compress the samples by removing certain leading sign bits from the samples. The processor may store the compressed bit in a memory and then utilize such stored samples to form packets. The processor further may insert an indicator corresponding to any particular compressed sample or a group of samples so as to enable the decompression of the compressed samples at a later time. A control unit placed remote from the sensors receives the transmitted packets; and decompresses the compressed packets. The processor also may vary the time interval between the transmissions of successive packets. A program associated with the processor enables the processor to vary the time based on: any suitable method including but not limited to: (i) using a random number generator; and (ii) using a time slot computation for the packets.

Both the method of compressing data by deleting bits in samples and varying time between transmissions of packets provide randomization. These methods may be utilized separately or concurrently.

The foregoing description is directed to particular embodiments for the purpose of illustration and explanation. It will be apparent, however, to one skilled in the art that many modifications and changes to the embodiments set forth above are possible without departing from the scope and the spirit of the disclosure. It is intended that the following claims be interpreted to embrace all such modifications and changes.

We claim:

1. A method of acquiring seismic data, comprising:
receiving seismic signals at one or more sensors;
sampling the received seismic signals into a plurality of samples;
arranging the plurality of samples into a plurality of packets;
transmitting the plurality of packets; and
reducing a coherent noise by making a transmission noise non-periodic by selectively varying time intervals between transmissions of the packets, wherein the transmission noise is from the transmission of the plurality of packets.

2. The method of claim 1 further comprising:
determining the time intervals between the transmissions of the packets using a random number generator.

3. The method of claim 1 further comprising:
using a time slot scheme for assigning the time intervals between the transmissions of the packets.

4. The method of claim 1 wherein each of the plurality of samples has an identical bit length.

5. The method of claim 1, wherein the time intervals between the transmissions of the packets corresponds to a time slot assignment scheme.

6. The method of claim 5, further comprising compressing at least one of the plurality of samples by deleting selected bits from the at least one of the plurality of samples.

7. The method of claim 1, wherein transmitting the plurality of packets further comprises transmitting the packets via one of: (i) land cable; (ii) wirelessly; (iii) an ocean bottom cable; and (iv) a streamer cable that is in data communication with a central recording unit on a vessel.

8. The method of claim 1 further comprising:
wherein the reduced coherent noise includes periodic signals that occur due to at least one of (i) a common mode of induction at a receiver, (ii) electronic switching, (iii) limited power supply noise rejection, (iv) common power supply, (v) common ground plane, and (vi) high energy computation bursts.

9. The method of claim 1 further comprising:
receiving the transmitted packets at a remote unit; and
processing the packets to obtain information about a subsurface structure.

10. A seismic data acquisition apparatus, comprising:
a circuit configured to receive seismic signals from a sensor and digitize the received seismic signals to provide a plurality of samples, each sample having a selected bit length;
a processor configured to:
arrange the plurality of samples into a plurality of packets;
transmit the plurality of packets; and
reduce a coherent noise by making a transmission noise non-periodic by selectively varying time intervals between transmissions of the packets, wherein the transmission noise is from the transmission of the plurality of packets.

11. The seismic data acquisition apparatus of claim 10, wherein each of the samples has an identical bit length.

12. The seismic data acquisition apparatus of claim 10, wherein the processor is further configured to utilize a time slot scheme for the transmission of the packets.

13. The seismic data acquisition apparatus of claim 10, wherein the processor is further configured to compress selected samples before arranging such samples in the packets.

14. The seismic data acquisition apparatus of claim 13, wherein the processor compresses the selected samples by deleting selected bits from such samples.

15. The seismic data acquisition apparatus of claim 10, wherein the processor is further configured to compute packet efficiency for a packet in the plurality of packets before transmitting such packets.

16. The seismic data acquisition apparatus of claim 13, wherein the processor is further configured to place an indicator in the packets that include compressed samples in order to identify the compressed samples.

17. The seismic data acquisition apparatus of claim 10 further comprising a remote unit in data communication with the processor, wherein the remote unit is configured to receive the transmitted packets; decompress the received packets; and store the decompressed packets.

18. The seismic data acquisition apparatus of claim 10, wherein the packets are transmitted via one of: (i) a land cable; (ii) wirelessly; (iii) an ocean bottom cable; and (iv) a streamer cable in data communication with a central recording unit on a vessel.

* * * * *